US00RE48208E

(19) United States
(12) Reissued Patent
Sato

(10) Patent Number: US RE48,208 E
(45) Date of Reissued Patent: Sep. 15, 2020

(54) TONER CARTRIDGE

(71) Applicants: TOSHIBA TEC KABUSHIKI KAISHA, Shinagawa-ku, Tokyo (JP); TOSHIBA AMERICA BUSINESS SOLUTIONS, INC., Irvine, CA (US)

(72) Inventor: Tsutomo Sato, Izunokuni (JP)

(73) Assignees: TOSHIBA TEC KABUSHIKI KAISHA (JP); TOSHIBA AMERICA BUSINESS SOLUTIONS, INC., Irvine, CA (US)

(21) Appl. No.: 15/586,863

(22) Filed: May 4, 2017

Related U.S. Patent Documents

Reissue of:
(64) Patent No.: 9,098,015
Issued: Aug. 4, 2015
Appl. No.: 14/247,474
Filed: Apr. 8, 2014

U.S. Applications:
(63) Continuation of application No. 14/076,591, filed on Nov. 11, 2013, now Pat. No. 8,712,259, which is a
(Continued)

(30) Foreign Application Priority Data

May 18, 2006 (JP) ..... 2006-139188
May 18, 2006 (JP) ..... 2006-139189

(51) Int. Cl.
*G03G 15/08* (2006.01)
*G03G 21/16* (2006.01)

(52) U.S. Cl.
CPC ..... *G03G 15/087* (2013.01); *G03G 15/0863* (2013.01); *G03G 15/0865* (2013.01);
(Continued)

(58) Field of Classification Search
None
See application file for complete search history.

(56) References Cited

U.S. PATENT DOCUMENTS 1,007,211 A * 10/1911 Sato ..... H03M 13/151
314/12
4,740,808 A 4/1988 Kasamura et al.
(Continued)

FOREIGN PATENT DOCUMENTS

CN 2718626 8/2005
JP 2001-255728 A1 9/2001
(Continued)

OTHER PUBLICATIONS

L.B. Schein, "Electro-photography and Development Physics," 1996, pp. 26, 38, 39; Laplacian Press, Morgan Hill, CA.
(Continued)

*Primary Examiner* — Glenn K Dawson
(74) *Attorney, Agent, or Firm* — Bracewell LLP; Douglas F. Stewart; Patrick J. Connolly

(57) ABSTRACT

A toner cartridge comprises a toner container which contains toner, a driving member winch rotationally drives a conveying member, an agitating member Which agitates a toner in the toner container while being rotated, a driven member which rotates in association with the driving member which is for rotationally driving the agitating member, and a rotational body which rotates according to rotation of the driven member, has a plurality of slits in rotational circumference for identifying a type of the toner cartridge, and has 1/K or more of the slits when a ratio of a rotational speed R1 (rad/s) of the driving member and a rotational speed R2 (rack) of the driven member is K=R2/R1.

6 Claims, 10 Drawing Sheets

Related U.S. Application Data continuation of application No. 13/898,681, filed on May 21, 2013, now Pat. No. 8,606,124, which is a continuation of application No. 13/650,620, filed on Oct. 12, 2012, now Pat. No. 8,472,815, which is a continuation of application No. 13/273,567, filed on Oct. 14, 2011, now Pat. No. 8,311,420, which is a continuation of application No. 12/850,794, filed on Aug. 5, 2010, now Pat. No. 8,150,275, which is a continuation of application No. 11/749,276, filed on May 16, 2007, now Pat. No. 7,792,438.

(52) U.S. Cl.
CPC ..... *G03G 15/0875* (2013.01); *G03G 15/0877* (2013.01); *G03G 15/0889* (2013.01); *G03G 21/1647* (2013.01); *G03G 21/1676* (2013.01)

(56) References Cited

U.S. PATENT DOCUMENTS

| | | | | |
|---|---|---|---|---|
| 5,940,658 | A | 8/1999 | Yokoi | |
| 6,041,212 | A | 3/2000 | Okada | |
| D442,214 | S | 5/2001 | Hayashi | |
| D442,624 | S | 5/2001 | Maeshima | |
| D447,168 | S | 8/2001 | Nishimura | |
| 6,298,202 | B1 | 10/2001 | Fushiya et al. | |
| 6,397,015 | B2 | 5/2002 | Curry | |
| 6,542,709 | B1 | 4/2003 | Wang et al. | G03G 15/0875 399/263 |
| 6,687,478 | B2 * | 2/2004 | Sugita | G03G 15/0875 399/258 |
| 7,003,233 | B2 | 2/2006 | Matsuda | |
| 7,373,096 | B1 | 5/2008 | Miller | |
| 7,734,197 | B2 | 6/2010 | Sato | G03G 15/0863 399/12 |
| 7,792,438 | B2 | 9/2010 | Sato | G03G 21/1647 399/12 |
| 8,150,275 | B2 | 4/2012 | Sato | G03G 21/1647 399/12 |
| 8,311,420 | B2 | 11/2012 | Sato | G03G 21/1647 399/12 |
| 9,581,938 | B2 * | 2/2017 | Sato | G03G 21/1647 |
| 2003/0063927 | A1 | 4/2003 | Wang et al. | G03G 15/0875 399/263 |
| 2005/0063733 | A1 | 3/2005 | Jeon | |
| 2007/0122203 | A1 | 5/2007 | Sugimoto et al. | |
| 2007/0269224 | A1 | 11/2007 | Sato | |
| 2007/0269225 | A1 | 11/2007 | Sato | |
| 2008/0170887 | A1 | 7/2008 | Nishimura et al. | |
| 2008/0170888 | A1 | 7/2008 | Eto et al. | |
| 2008/0175629 | A1 | 7/2008 | Eto et al. | |
| 2010/0322641 | A1 | 12/2010 | Sato | |
| 2011/0280623 | A1 * | 11/2011 | Heo | G03G 15/0896 399/120 |

FOREIGN PATENT DOCUMENTS

| | | | |
|---|---|---|---|
| JP | 2001255728 | * | 9/2001 |
| JP | 2002-006610 | | 1/2002 |
| JP | 2002-244534 | | 8/2002 |
| JP | 2003-050505 | | 2/2003 |
| JP | 2004264460 | * | 9/2004 |
| JP | 2005-099434 | | 4/2005 |
| JP | 2006-030303 | | 2/2006 |
| JP | 2006-091032 | | 4/2006 |

OTHER PUBLICATIONS

H.H. Mabie & C.F. Reinholtz, "Mechanisms and Dynamics of Machinery," 1987, p. 246; John Wiley & Sons, New York, NY.
John G. Webster, "The Measurement, Instrumentation, and Sensors Handbook," 1999; CRC Press LLC.
Buyers Laboratory Report showing Kyocera TK-57 Cartridge Product Information from Apr. 2004, last accessed Apr. 20, 2016.
U.S. Office Action mailed Aug. 14, 2009 corresponding to U.S. Appl. No. 11/749,276, filed May 16, 2007.
U.S. Office Action mailed Dec. 14, 2009 corresponding to U.S. Appl. No. 11/749,276, filed May 16, 2007.
Chinese Office Action mailed Sep. 21, 2008 corresponding to U.S. Appl. No. 11/749,276, filed May 16, 2007.
Japanese Office Action for Application No. 2006-139189 mailed on Sep. 6, 2011.
Japanese Office Action for Application No. 2006-139189 mailed Jun. 21, 2011.
Japanese Office Action for Application No. 2006-139188 mailed Jun. 28, 2011.
U.S. Office Action mailed Nov. 16, 2010 responding to U.S. Appl. No. 12/850,794, filed Aug. 5, 2010.
Japanese Office Action for Japanese Application No. 2012-108465 mailed on Aug. 21, 2012.
Japanese Office Action for Japanese Application No. 2012-8508 mailed on Aug. 21, 2012.
U.S. Office Action mailed Mar. 15, 2012 corresponding to U.S. Appl. No. 13/273,567, filed Oct. 14, 2011.

* cited by examiner

TONER CARTRIDGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Continuation of application Ser. No. 14/076,591 filed Nov. 11, 2013, which is a Continuation of application Ser. No. 13/898,681 filed May 21, 2013, which is a Continuation of application Ser. No. 13/650,620 filed Oct. 12, 2012, which is a Continuation of application Ser. No. 13/273,567 filed Oct. 14, 2011, which is Continuation of application Ser. No. 12/850,794 filed Aug. 5, 2010, which is a Continuation of application Ser. No. 11/749,276 filed May 16, 2007, which is based upon and claims the benefit of priority from prior Japanese Patent Applications No. 2006-139188, filed May 18, 2006; and No. 2006-139189, filed May 18, 2006, the entire contents of all of which are incorporated herein by reference.

BACKGROUND OF THE INVENTION

1. Field of the Invention

The present invention relates to a toner cartridge for supplying toner to an image forming apparatus.

2. Description of the Related Art

An image forming apparatus has a toner cartridge for supplying toner to the apparatus. The toner cartridge is inserted in the image forming apparatus in a removable manner. Also, the toner cartridge is configured such that the user can exchange the toner cartridge himself or herself when the toner cartridge is emptied of toner. In addition, a filling opening is provided in the toner cartridge and the toner is supplied through the filling opening. In the toner cartridge, a mixer is rotated constantly so as to prevent the toner from solidifying inside the toner cartridge.

In many cases, a manufacturer recommended product including a genuine product is set with respect to the toner cartridge such as above. This is because using a toner cartridge other than the recommended product is considered to cause a possible problem in the image forming apparatus. In a color image forming apparatus, the toner cartridge needs to be inserted in an appropriate position depending on a color of toner. For this reason, there is also an image forming apparatus which is configured so as to discriminate whether a inserted toner cartridge is recommended or not, and a type of the toner cartridge including a type of toner.

Jpn. Pat. Appln. Publication No. 2001-255728 discloses a slit disk which is provided at each toner cartridge and attached on an axis of a rotary shaft of a paddle, and in which slits are formed with specified intervals in a peripheral direction and slit intervals are mutually differently formed. A photosensor can detect the slit and detect a type of the toner cartridge from a detected signal.

U.S. Pat. No. 6,542,709 discloses a method of driving a paddle wherein a driving gear is arranged on one end of an auger for conveying toner, and a driven gear provided on one end of the paddle is rotated by the driving gear through an indirect gear.

In addition, Jpn. Pat. Appln. Publication No. 2004-264460 discloses a cartridge which has a paddle and an auger rotated by a driving gear, a driven gear, etc. provided on an external side of a toner cartridge.

However, when a slit is detected by rotating an axis of a paddle in which slits are formed as disclosed in Jpn. Pat. Appln. Publication No. 2001-255728, and when a rotary force of the paddle is a driven rotary force based on a rotation of an auger such as the one shown in U.S. Pat. No. 6,542,709, there is need to take into consideration a necessary rotation to ensure correct detection of the slit. However, a toner cartridge taking into consideration the above point does not exist, and this has resulted in detection in error.

When the inventors of the present invention attempted to have a toner cartridge having a gear on an external side of the cartridge optically detect the slit disclosed in Jpn. Pat. Appln. Publication No. 2001-255728, there occurred a problem that the gear entangles a variety of lead wires used for detection.

The present invention is invented in view of the above circumstances. An object of the present invention is to provide a toner cartridge which can correctly discriminate a type of the toner cartridge inserted in the image forming apparatus and a toner cartridge which does not interfere with optical detection carried out by the image forming apparatus.

BRIEF SUMMARY OF THE INVENTION

According to one aspect of the present invention, there is provided a toner cartridge comprising: a toner container which contains toner; a toner supplying opening which is formed in the toner container and supplies the toner to the image forming apparatus, a conveying member which conveys the toner toward the toner supplying opening in the toner container while being rotated; a driving member which rotationally drives the conveying member, an agitating member which agitates the toner in the toner container while being rotated, a driven member rotated in association with the driving member which is for rotationally driving the agitating member and a rotational body rotated according to rotation of the driven member, having a plurality of slits in rotational circumference, wherein the number of slits is 1/K or more of the slits when a ratio of a rotational speed R1 (rad/s) of the driving member and a rotational speed R2 (rad/s) of the driven member is K=R2/R1.

According to one aspect of the present invention, there is provided a toner cartridge comprising: a toner container which contains toner, a toner supplying opening which supplies the toner contained in the toner container to the image forming apparatus, an agitating member which agitates the toner contained in the toner container, a conveying member which conveys the toner contained in the toner container toward the supplying opening, one, two or more of gears which are provided on an exterior portion of the toner container and rotates the conveying member and the agitating member and a gear cover which covers circumference of the one, two or more of the gears.

DETAILED DESCRIPTION OF THE INVENTION

Hereinafter, a preferred embodiment for carrying out the present invention will be described.

Figure 1:
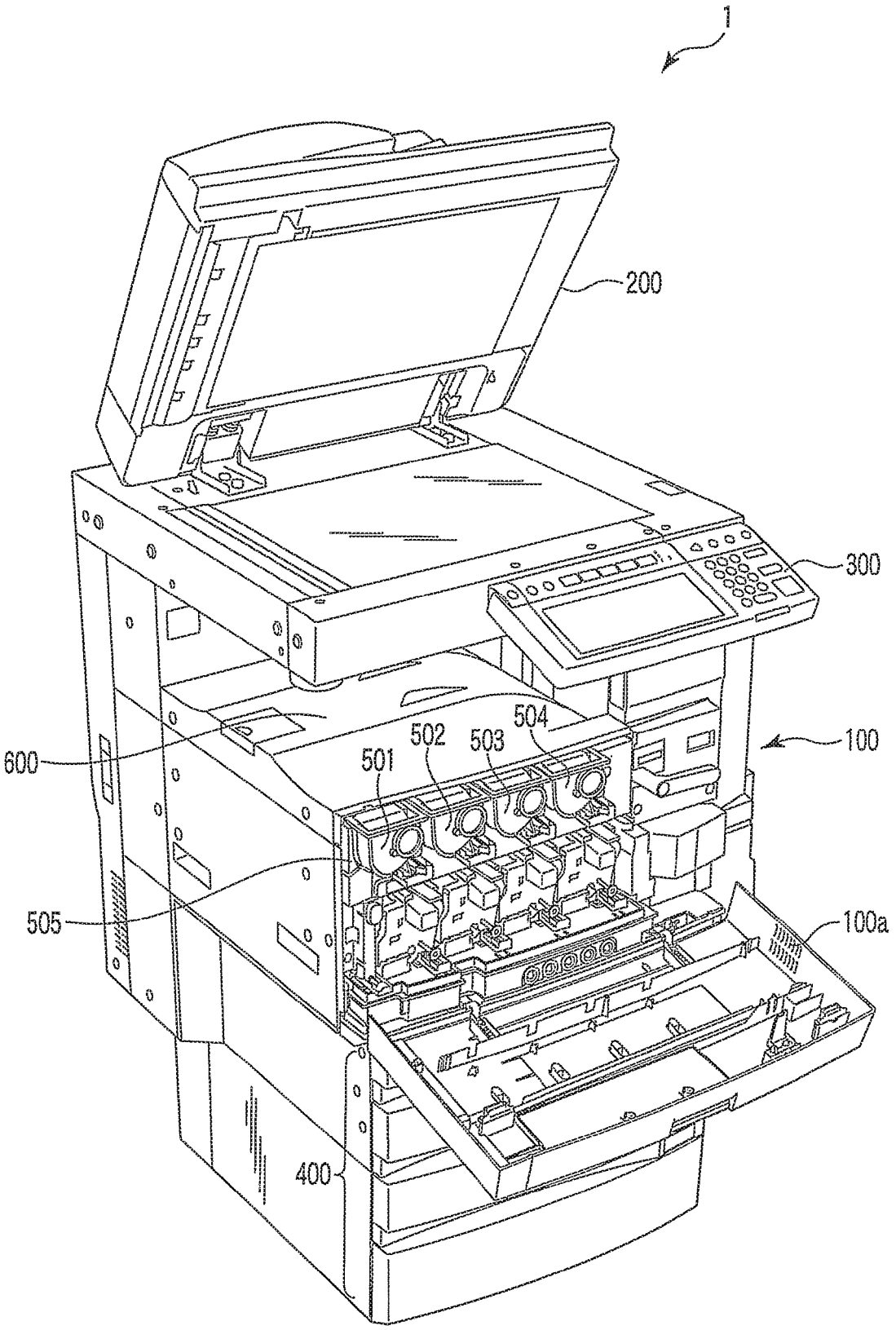
FIG. 1 is a schematic view showing an internal structure of an image forming apparatus according to one embodiment of the present invention.

FIG. 1 is a perspective view of a schematic view showing an internal structure of an image forming apparatus 1 according to an embodiment of the present invention. As shown in FIG. 1, the image forming apparatus 1 is a color copier of a quadruple tandem system. The image forming apparatus 1 includes a copier main body 100, a platen cover 200, a control panel 300, and a plurality of paper feeding cassettes 400.

The copier main body 100 plays a major role in image forming, and has a cover 100a provided on a front surface thereof in an openable and closable manner. When the cover 100a is opened, first to fourth toner cartridges 501 to 504 are found to be arranged in alignment on an upper portion side of the cover 100a. The platen cover 200 is provided on the copier main body 100 in an rotatable manner with one side edge as a rotational center. The control panel 300 is an input unit for copy operation and is provided on a top surface of the copier main body 100. The paper feeding cassette 400 is for containing paper and is provided on a lower side of the copier main body 100 in a removable manner. In addition, a paper delivering unit 600 is provided on top of a portion where the first to fourth toner cartridges 501 to 504 are provided.

Each of the first to fourth toner cartridges 501 to 504 is provided in a removable manner in a cartridge holding mechanism 505. The first to fourth toner cartridges 501 to 504 are for supplying toner of yellow, magenta, cyan, and black.

Next, a configuration of the first toner cartridge 501 will be described with reference to FIG. 2. Description of configurations of the second to fourth toner cartridges 502 to 504 will be omitted, since such configurations are almost same as the configuration of the first toner cartridge 501.

Figure 2:
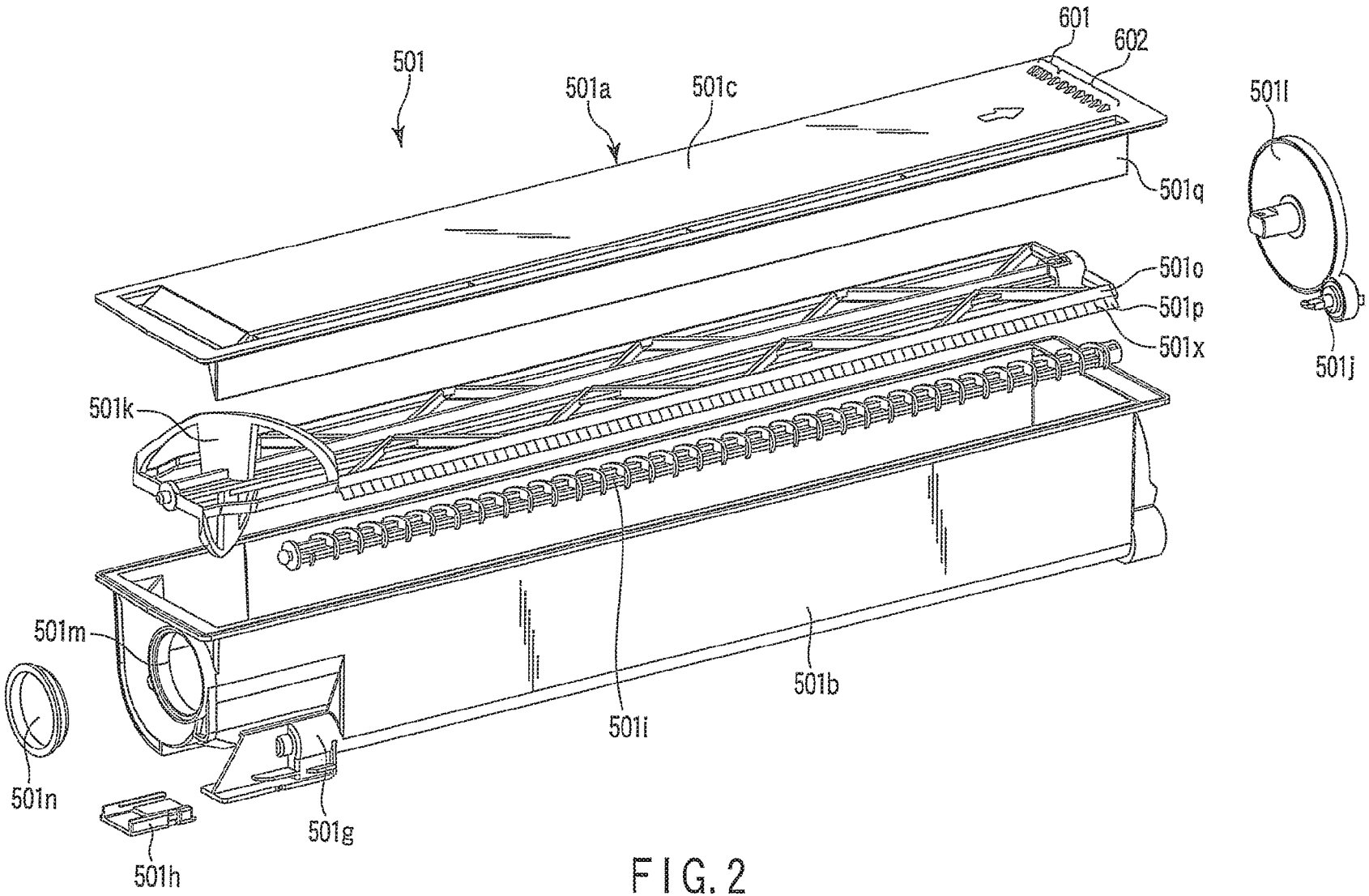
FIG. 2 is a perspective view showing a toner cartridge according to the embodiment as viewed from upper front side thereof.

FIG. 2 is a perspective view showing an entire configuration of the first toner cartridge 501 according to the present embodiment viewed from a front surface side. Here, a surface with a cap 501n of the first toner cartridge 501 is the front surface side, and a surface with a mixer gear 501l is a rear side.

As shown in FIG. 2, the first toner cartridge 501 includes a cartridge main body 501a working as a toner container for containing the toner. The cartridge main body 501a is configured with a container body 501b and a lid body 501c. Also, first and second discriminating protrusion units 601 and 602 for discriminating toner information are provided on a rear side of the cartridge main body 501a.

The container body 501b has a U-shaped cross section. The lid body 501c has a rectangular plate shape. On a front surface side of the container body 501b, there is provided a discharging unit 501g which discharges the toner in the cartridge main body 501a and works as a toner supplying opening for supplying the toner in the image forming apparatus 1. The discharging unit 501g projects downwardly from a bottom surface of the container body 501b. On a bottom edge part of the discharging unit 501g, there is provided a shutter 501h for opening and closing a discharging opening (not shown) formed on the discharging unit 501g.

Figure 7:
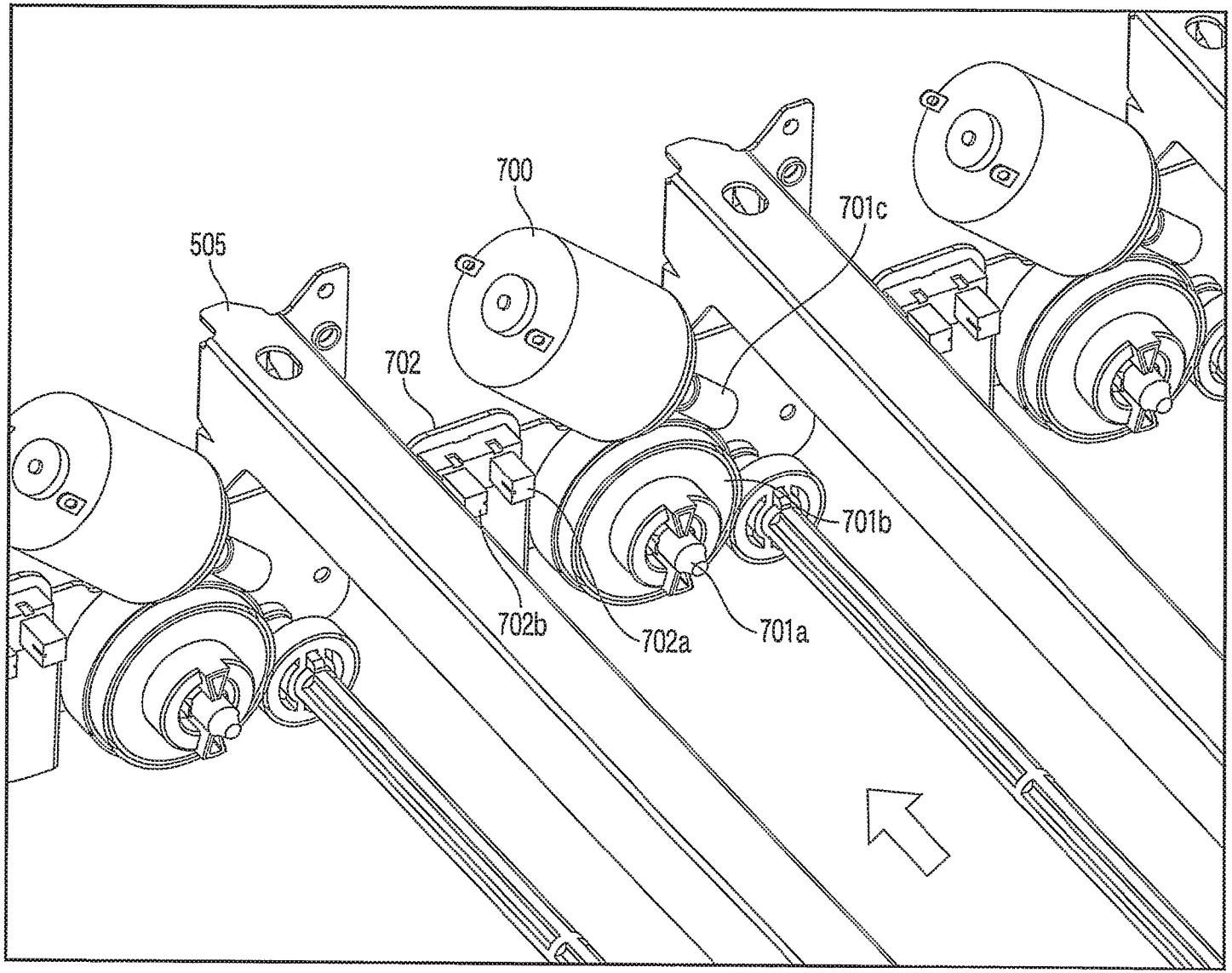
FIG. 7 is a perspective view of an inside of the image forming apparatus according to the embodiment as viewed from upper front side thereof.

At the inner bottom of the containing unit 501b, there is provided a screw 501i working as a conveying member for conveying the toner in the cartridge main body 501a to the discharging unit 501g. On an end part on a rear surface side of the screw 501i, there is provided a coupling member 501j working as a driving member. The coupling member 501j is connected to a driving apparatus 700 shown in FIG. 7 provided in the copier main body 100, and rotationally driven every time the toner is supplied.

Inside the cartridge main body 501a, there is provided a mixer 501k for agitating the toner in the cartridge main body 501a. At an end part on a rear surface of the mixer 501k, there is provided a mixer gear 5011. The mixer gear 501l meshes with the coupling member 501j working as a gear provided in the screw 501i. When the screw 501i is rotated, the mixer gear 501k is configured to rotate in association therewith.

On a front surface side of the container body 501b, there is formed a filling opening 501m used for filling the toner in the cartridge main body 501a. The filling opening 501m has a circular shape, and is sealed with the cap 501n.

Figure 3:
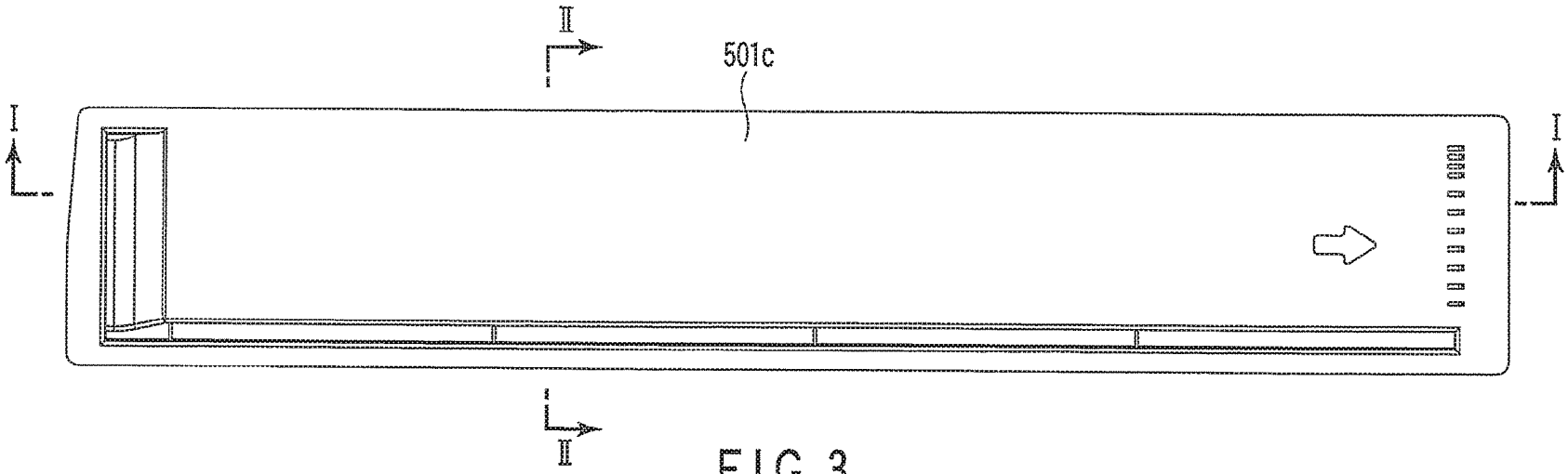
FIG. 3 is a plan view showing the toner cartridge according to the embodiment as viewed from above.
Figure 4:
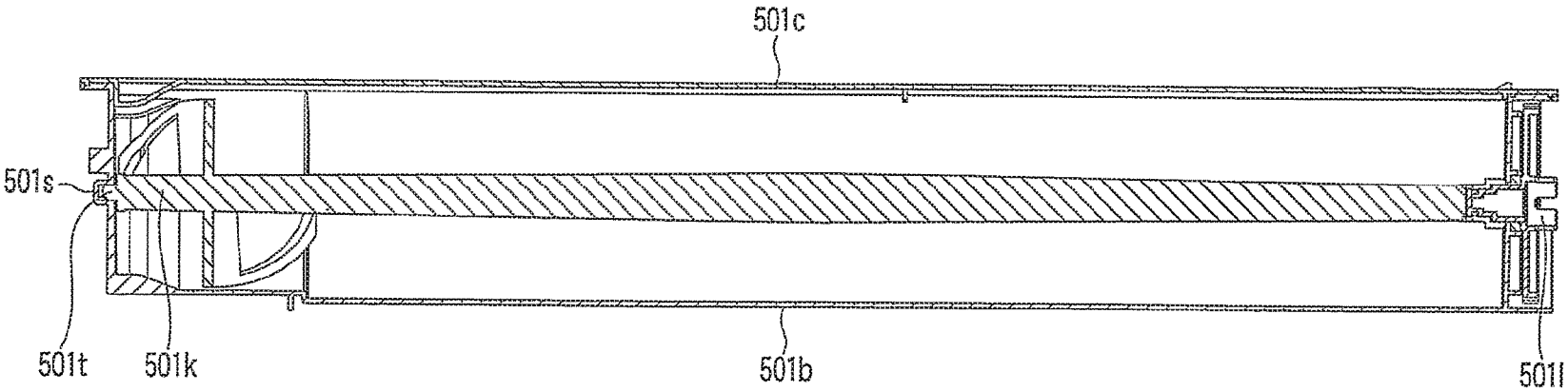
FIG. 4 is a transverse cross-sectional view showing an internal structure of the toner cartridge according to the embodiment.

FIG. 3 is a view of the first toner cartridge 501 viewed from above a top surface. In addition, FIG. 4 shows a cross-sectional view of the first toner cartridge 501 cut along the line I-I in FIG. 3. The mixer 501k is fixed as described below. On a rear side surface of the first toner cartridge 501, the mixer 501k connects with the mixer gear 501l with a coupling unit interposed therebetween. In addition, on a front surface side of the first toner cartridge 501, the mixer 501k has a convex part 501t formed in a convex shape at an end part, and fits in a concave part 501s provided on a front surface side of the container body.

Here, an inner diameter of the concave part 501s is little larger than an outer diameter of the convex part 501t. For this reason, when the mixer 501k rotates to agitate the toner, the toner enters into a little gap between the convex part 501t and the concave part 501s. In this manner, friction between the convex part 501t and the concave part 501s is reduced, and the mixer 501k can rotate smoothly.

Figure 5:
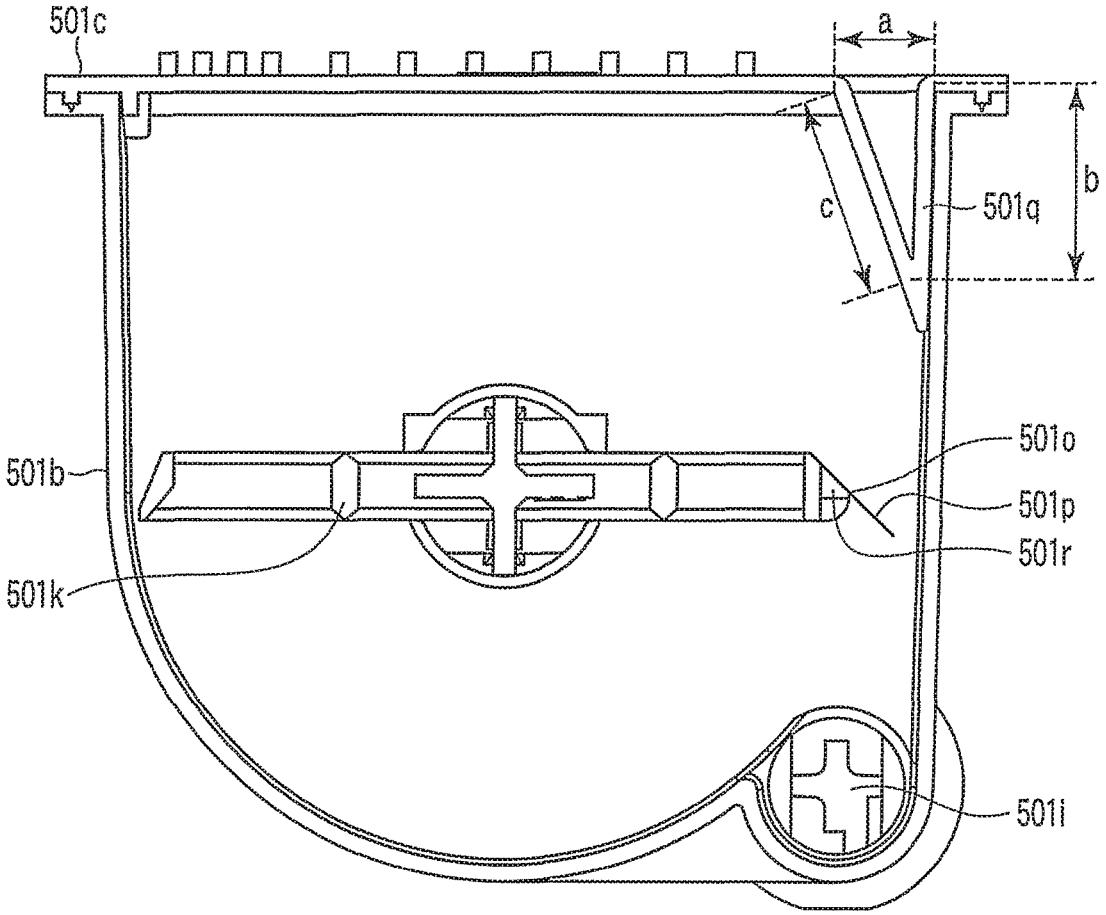
FIG. 5 is a vertical cross-sectional view showing the internal structure of the toner cartridge according to the embodiment.

FIG. 5 shows a cross-sectional view of the first toner cartridge 501 cut along the line II-II in FIG. 3. The lid body 501c has a lid body protrusion part 501q. The lid body protrusion part 501q is provided at an upper edge of the container body 501b when the lid body 501c is inserted in the container body 501b. The lid body protrusion part 501q is a protrusion having a cross-sectional triangle shape enclosed by a line a, a line b, and an oblique line c. The line a has a predetermined length in a width direction from a connection of the lid body 501c and the container body 501b. The line b has a predetermined length from the connection of the lid body 501c and the container body 501b to the container body 501b and crosses the line a at a substantial right angle. The oblique line c is determined by the above two sides.

In addition, a surface enclosed by the line b having a predetermined length of the lid body protrusion part 501q and a longitudinal direction of the lid body 501c is formed such that the lid body 501c abuts the container body 501b without having any gap interposed therebetween when the lid body 501c is inserted in the container body 501b.

When the amount of the toner in the toner cartridge main body 501a becomes little, a gap appears between an outer periphery of the mixer 501k and an inner wall of the container body 501b. Therefore, the toner remaining in the gap cannot be conveyed by the mixer 501k. However, in the present embodiment, the lid body protrusion part 501q fills the gap appearing in the connection of the container body 501b and the lid body 501c. Therefore, the toner can be prevented from remaining in the gap.

Further, the lid body protrusion part 501q is provided with a surface having the oblique line c. Therefore, the toner adhered to the lid body protrusion part 501q easily flows down to an inside bottom of the container body 501b, and adherence of the toner hardly occurs.

In addition, as shown in FIG. 5, a sweep sheet 501o is fixed on a mounting surface 501r which is an outer periphery part of the mixer 501k. In addition, a sweep part 501p, which is a free end not fixed on the mounting surface 501r of the sweep sheet 501o, projects in a further extended direction from an outer periphery part of the mixer 501k. The mixer 501k rotates counterclockwise in FIG. 5 which is a cross-sectional view of the first toner cartridge 501 viewed from a front surface side. For this reason, the sweep part 501p abuts the inner bottom of the container body 501b.

Further, as shown in FIG. 2, on the mounting surface 501r of the mixer 501k, there is inserted the sweep sheet 501o in a longitudinal direction. In addition, a plurality of cut parts 501x shown in FIG. 2 are formed on the sweep sheet 501o with predetermined intervals for an overall length in a width direction in a direction substantially parallel to a rotational axis.

When a driving force is transmitted from the driving apparatus 700 shown in FIG. 7 to rotationally drive the coupling member 501j, the screw 501i is rotationally driven in an integrated manner, and the mixer 501k is rotationally driven via the mixer gear 501l. In this manner, the mixer 501k agitates and sends out the toner to the screw 501i at the same time. The screw 501i conveys the sent-out toner to the discharging unit 501g. Then, the toner is discharged from the discharging unit 501g. When the first toner cartridge 501 just starts to be used, the toner amount in the container body 501b is large. Even when the mixer 501k and the sweep sheet 501o rotate in an integrated manner, the toner in contact with the sweep part 501p passes through the cut parts 501x and flows toward a rear direction of the sweep part 501p. Therefore, the sweep sheet 501o never interferes with the rotation of the mixer 501k.

In addition, when the toner amount of the first toner cartridge 501 becomes small, a gap is formed between the outer periphery part of the mixer 501k and the inner wall of the container body 501b. Therefore, the toner remaining in the gap cannot be conveyed by the mixer 501k. However, the sweep sheet 501o abuts the inner bottom of the container body 501b. Therefore, the toner remaining in the gap can be sent out to the screw 501i. In this way, an amount of the remaining toner in the first toner cartridge 501 can be reduced.

Next, a rotational body 501v which is an important part of the present embodiment and a periphery thereof will be described by using FIGS. 6 to 9. In addition, a coupling member 501j in the first toner cartridge 501, drive of the mixer gear 501l in association therewith, the driving device 700 for driving the coupling member 501j inserted in the copier main body 100, and a method for discriminating a type of the first toner cartridge 501 inserted in the copier main body 100 will be described as well. Here, as the discrimination of a type of the first toner cartridge 501, discrimination of whether the toner cartridge is a genuine product or not will be taken as an example.

Figure 6:
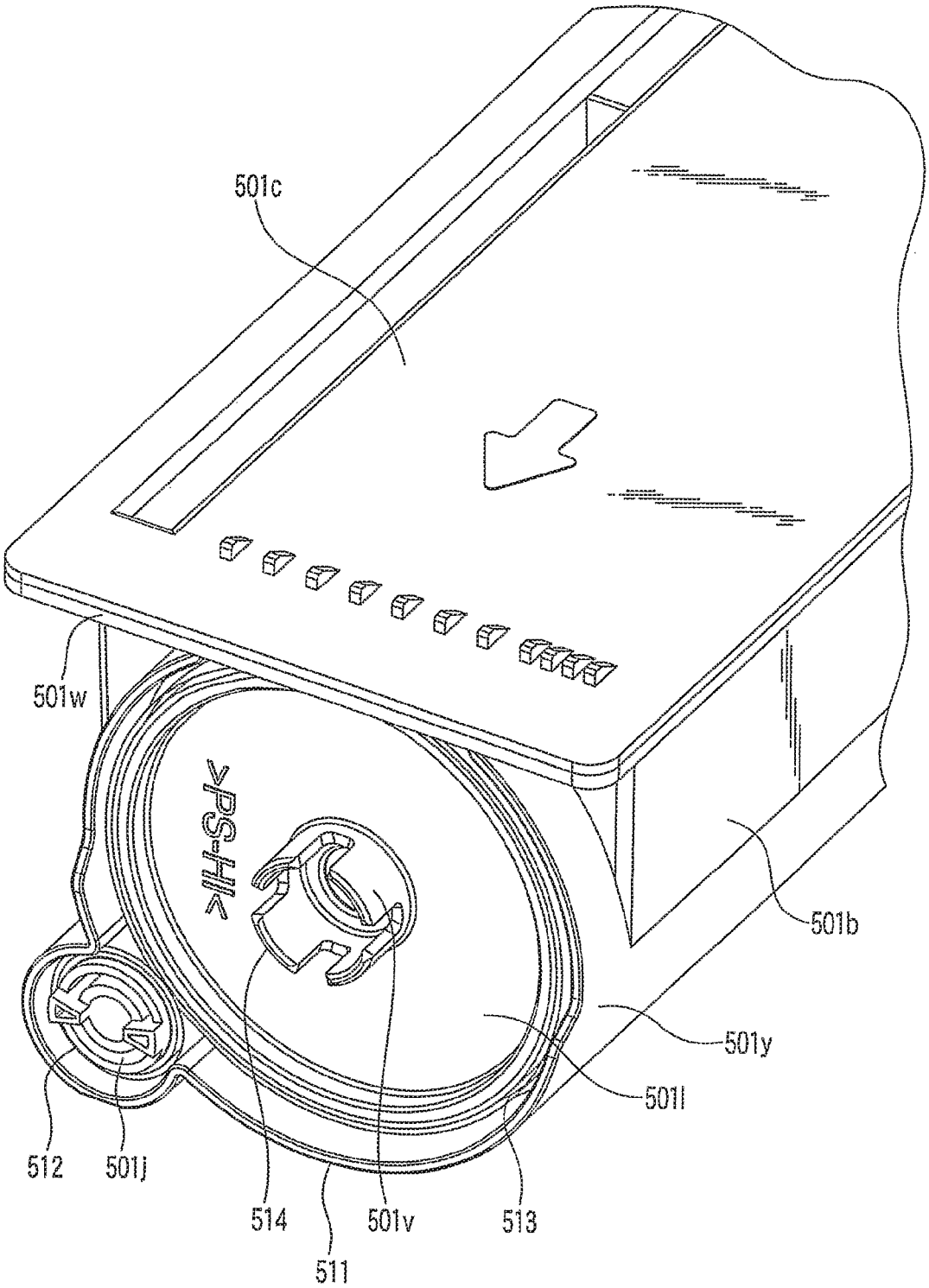
FIG. 6 is an enlarged perspective view of the toner cartridge according to the embodiment as viewed from rear upper side thereof.

FIG. 6 is a perspective view of an entire configuration of the first toner cartridge 501 according to the present embodiment viewed from a rear surface side. In FIG. 6, the coupling member 501j to which a rotational force is applied is shown. When the coupling member 501j is rotationally driven, the mixer gear 501l rotates, and the rotational body 501v provided coaxially with the mixer gear 501l rotates.

Figure 8:
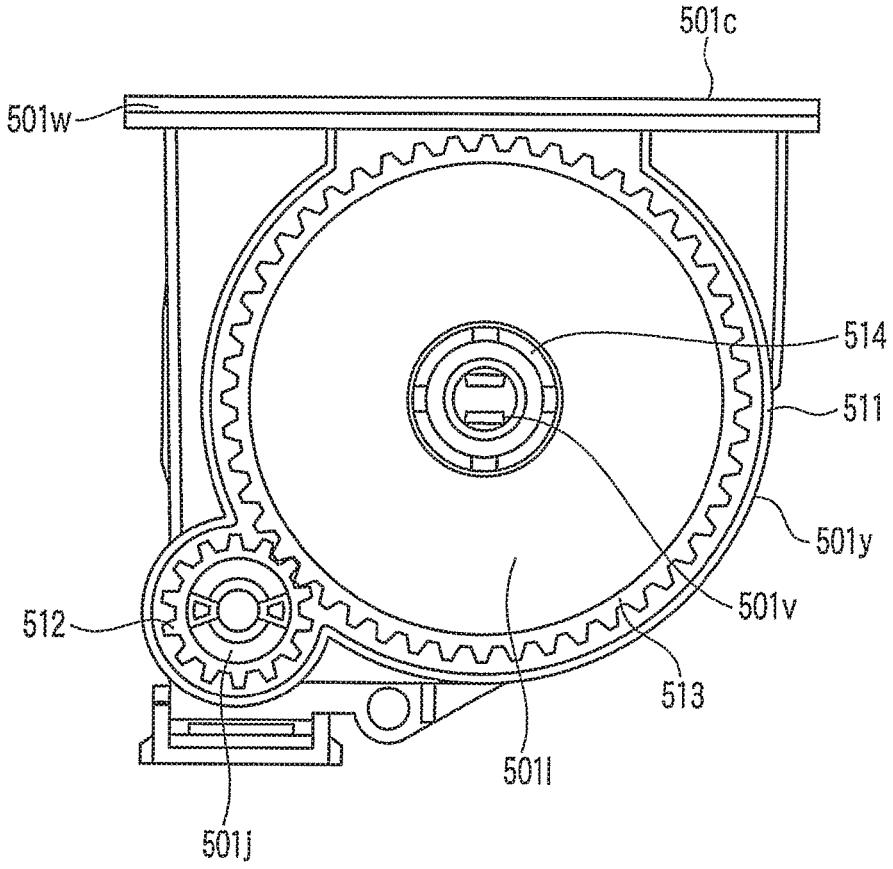
FIG. 8 is a view of the toner cartridge according to the embodiment as viewed from a rear surface thereof.
Figure 9:
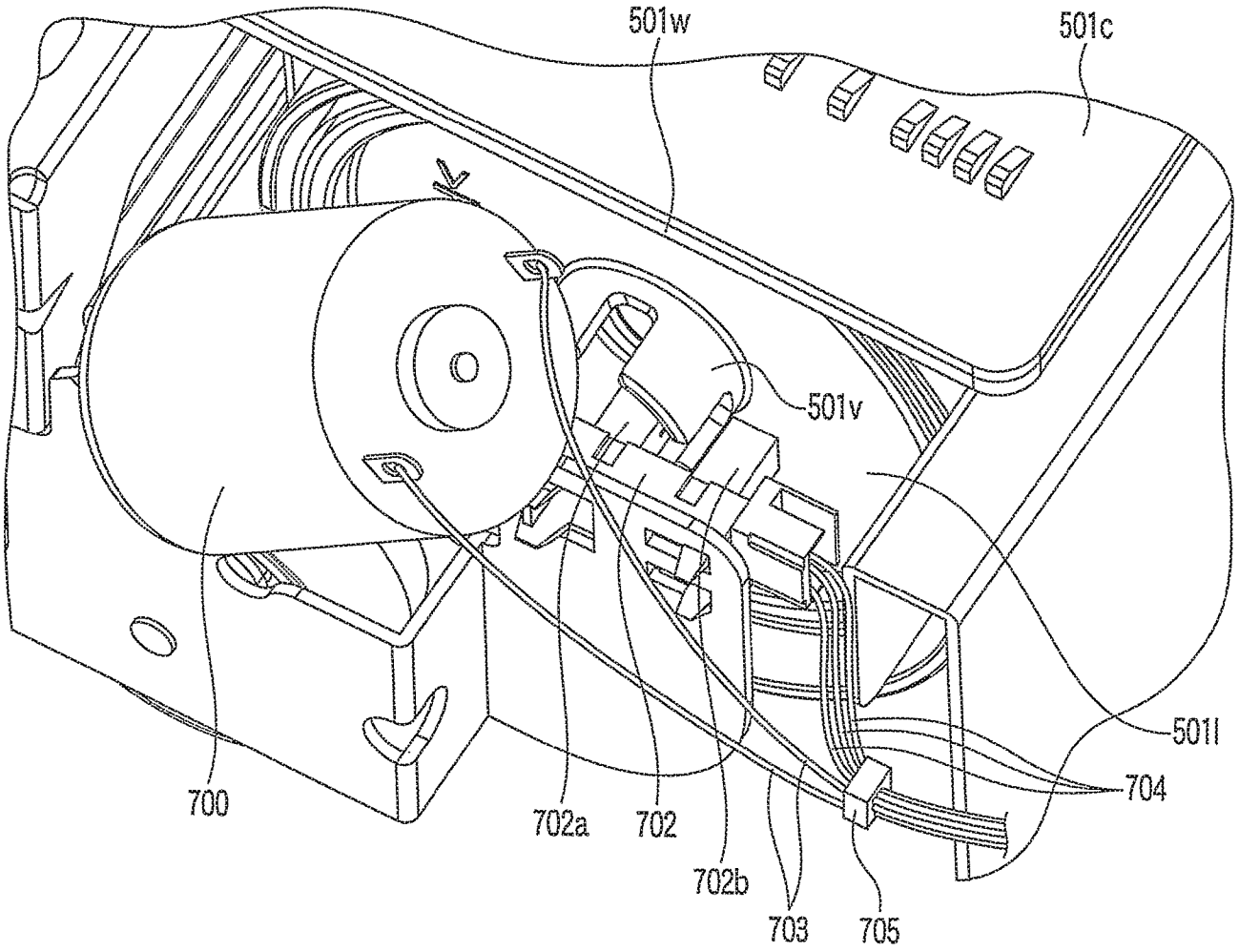
FIG. 9 is an enlarged perspective view of the toner cartridge according to the embodiment as viewed from rear upper side thereof.

FIG. 7 is a perspective view of the driving device 700 for rotating the coupling member 501j and an optical detector 702 viewed from a front surface side. In FIG. 7, the driving device 700, a first drive gear 701b rotated by the driving device 700, and a second drive gear 701c are shown. The first drive gear 701b has a drive coupling member 701a coaxially. The drive coupling member 701a can be connected with the coupling member 501j. At this time, a part of the rotational body 501v enters between a light emitting element 702a and a light receiving element 702b of the optical detector 702. FIG 8 is a view of the first toner cartridge 501 viewed from a rear surface side. FIG. 9 is a perspective view showing a state, in which the coupling member 501j of the first toner cartridge 501 is connected with the drive coupling member 701a rotationally driven by the driving device 700 via a gear, viewed from a rear surface side. FIG. 8 shows a relationship between the rotational body 501v and the light emitting element 702a and the light receiving element 702b.

Now, the first toner cartridge 501 is inserted in a direction of arrows shown in FIGS. 6 and 7 and inserted in a predetermined slot of a cartridge holding mechanism 505. Center axes of the coupling member 501j having a substantial cylindrical shape shown in FIG. 6 and the drive coupling member 701a having a substantially cylindrical shape shown in FIG. 7 are positioned coaxially, and face each other. When the mounting of the first toner cartridge 501 is completed, the drive coupling member 701a and the coupling member 501j fit with each other. For this reason, when the drive coupling member 701a rotates, the coupling member 501j also rotates at the same rotational speed in accordance therewith.

In addition, on an opposite surface of the surface of the driving coupling member 701a which fits with the coupling member 501j of the first toner cartridge 501, the first drive gear 701b is coupled coaxially. The driving device 700 has the second drive gear 701c inserted in a front edge of a rotational axis thereof. Gears formed on outer periphery surfaces of the first drive gear 701b and the second drive gear 701c mesh with each other such that when the second drive gear 701c rotates, the first drive gear 701b rotates is accordance therewith.

For the above reason, when the second drive gear 701c is rotated by the driving device 700, the drive gear 701b rotates in accordance therewith, and the drive coupling member 701a coupling with the first drive gear 701b also rotates. Further, the coupling member 501j of the first toner cartridge 501 fitting with the drive coupling member 701a also rotates.

In the first toner cartridge 501, when a driving force of the driving device 700 is transmitted and the coupling member 501j is rotationally driven, the screw 501i is rotationally driven in an integrated manner. Then, a gear formed on an outer periphery surface of the coupling member 501j meshes with a gear formed on an outer periphery surface of the mixer gear 501l, and the mixer gear 501l is also rotationally driven.

In this manner, the mixer 501k agitates toner and also sends out the toner to the screw 501i, and the screw 501i conveys the conveyed toner to the discharging part 501g.

In addition, as shown in FIG. 6, the mixer gear 501l is coupled with the rotational body 501v which is concentric with the mixer gear 501l and has a cylindrical shape with an outer diameter smaller than the mixer gear 501l. The rotational body 501v projects from a surface of the mixer gear 501l facing outside with respect to the first toner cartridge 501. The rotational body 501v is coaxial with the first toner cartridge 501 and has a substantially cylindrical shape with predetermined height in an extending direction.

The rotational body 501v has a plurality of slits formed thereon radially with equal intervals from a center axis toward an outer periphery surface, the slits working as light incidence parts. When the mounting of the first toner cartridge 501 is completed, the plurality of slits provided in a height direction parallel to an axis of the rotational body 501v only need to be inserted deep enough not to interfere with the light receiving element 702b (for example, photodiode) receiving light emitted from the light emitting element 702a (for example, light emitting diode) described later.

As shown in FIGS. 7 and 9, the optical detector 702 is inserted in the copier main body 100. The optical detector 702 includes the light emitting element 702a and the light receiving element 702b (the light emitting element may be 702b and the light receiving element may be 702c). The light emitting element 702a and the light receiving element 702b face each other with a predetermined interval interposed therebetween.

The light emitting element 702a may be any element which emits visible light and infrared light. In addition, as the optical detector 702, a detector using laser may be used.

When the mounting of the first toner cartridge 501 is completed, the light emitting element 702a is arranged such that the light emitting element 702a is positioned, for example, on a center axis of the rotational body 501v, and does not contact the inside of the rotational body 501v. In addition, the light receiving element 702b is positioned to sandwich a part of the rotational body 501v with the light emitting element 702a, that is, the light receiving element 702b is positioned at an outer periphery side of the rotational body 501v. The light receiving element 702b receives light from the light emitting element 702a.

Here, a rotational speed of the coupling member 501j and a rotational speed of the mixer gear 501l are not identical since outer diameters thereof are different. The screw 501i needs to rotate fast since the screw 501i has to convey the toner to the discharging part 501g sequentially. Agitation of the toner by the mixer 501k needs to be carried out slowly in order to prevent stress to the toner and attaching of the toner to inner walls of the container body 501b and the lid body 501c. Therefore, a rotational speed of the mixer 501k is slower than a rotational speed of the screw 501i. In other words, the rotational speed of the mixer gear 501l connected to the mixer 501k is slower than the rotational speed of the coupling member 501j connected to the screw 501i. That is, an outer diameter of the mixer gear 501l winch meshes with the coupling member 501j and rotates is larger than an outer diameter of the coupling member 501j.

For this reason, a rotational speed of the rotational body 501v coupled with the mixer 501k is similarly slower than the rotational speed of the coupling member 501j. In the present embodiment, a gear ratio is 1:3.7, therefore, the mixer gear 501l is 3.7 times slower than the coupling member 501j.

The rotational speed of the mixer 501k (and the rotational body 501v) cannot be made fast due to the reason described above. Still, time required for detection of the rotational body 501v needs to be short.

This is because, if the time required for the detection of the rotational body 501v is long, the screw 501i rotates 3.7 times as much as the mixer 501k rotates, and the toner of an amount more than necessary is supplied to the discharging part 501g during the detection. Supplying the toner more than necessary causes reduction in image quality. For such a reason, in the present embodiment, the number of the slits formed on the rotational body 501v is devised in order to carry out the accurate detection by the optical detector 702 in a short period of time.

For example, the rotational speed of the coupling member 501j and the rotational speed of the mixer gear 501l are not taken into consideration, and the slits with an appropriate open angle are assumed to be provided at two positions on the rotational body 501v with equal intervals with respect to 360 degrees per cycle. Since the rotational speed of the mixer gear 501l is slow and the interval between the slits is large, time of the detection by the optical detector 702 becomes long. If the time of the detection attempts to be made shorter on the contrary, the optical detector 702 lacks accuracy of the detection.

For the above reason, in order to ensure the detection with high accuracy, the number of the slits appropriate for narrowing the interval between the slits needs to be determined. Then, by a ratio of rotational speeds between the rotational speed of the coupling member 501j and the rotational speed of the mixer gear 501l, the appropriate number of the slits can be determined. The rotational speed of the coupling member 501j is assumed to be R1 (rad/s), and the rotational speed of the mixer gear 501l is assumed to be R2 (rad/s). When a ratio of both of the rotational speeds is K=R2/R1, only 1/K or more of the slits need to be formed on the rotational body 501v. In the present embodiment, a ratio between the rotational speed R1 of the coupling member 501j and the rotational speed R2 of the mixer gear 501l is 3.7:1. Therefore, in the present embodiment, 3.7 is rounded up, and a case where four of the slits are formed is shown. By configuring the rotational body 501v as described above, the detection of rotation of the rotational body 501v can surely be carried out during one rotation of the coupling member 501j.

As shown in FIGS. 6, 8, and 9, on an outer periphery surface of the rotational body 501v, the slits are formed at four positions with equal intervals with respect to 360 degrees per cycle. The open angle of the slits is, for example, 30 degrees. Here, shapes of the coupling members 501j, the mixer gear 501l, and the rotational body 501v are all the same among the first to the fourth toner cartridges 501, 502, 503, and 504 for four colors.

When the first toner cartridge 501 is inserted in predetermined position of the copier main body 100, the driving device 700 rotates the second drive gear 701c, the gears formed on the outer periphery surfaces mesh with each other, the first drive gear 701b rotates, and the drive coupling member 701a coupled with the first drive gear 701b also rotates. Then, the coupling member 501j of the first toner cartridge 501 fitting with the drive coupling member 701a also rotates. Together therewith, since the gear formed on the outer periphery surface of the coupling member 501j and the gear formed on the outer periphery surface of the mixer gear 501l mesh with each other, the mixer gear 501l is also rotationally driven. Then, the rotational body 501v with the plurality of slits formed thereon which is coupled with the mixer gear 501l also rotates.

In addition, as shown in FIG. 9, the light emitting element 702a is housed so as not to contact the inside of the rotational body 501v. The light receiving element 702b is positioned so as to sandwich the rotational body 501v with the light emitting element 702a, that is, on an outer periphery of the rotational body 501v.

Since the plurality of slits are formed on the outer periphery surface of the rotational body 501v, when the rotational body 501v rotates, there are a case where the light receiving element 702b cannot receive light from the light emitting element 702a due to the rotational body 501v and a case where the light receiving element 702b can receive the light since the light passes through the slit of the rotational body 501v. The optical detector 702 supplies to a controlling unit (not shown) a signal whose level changes depending on the light receiving of the light receiving element 702b in sync with light shielding of the light from the light emitting element 702a due to rotation of the mixer gear 501l.

The optical detector 702 outputs to the controlling unit a signal H when the light receiving element 702b does not receive light from the light emitting element 702a, and a signal L when the light receiving element 702b receives light from the light emitting element 702a. In the present embodiment, on the outer periphery surface of the rotational body 501v, the slits each having 30 degrees are formed at four positions with equal intervals with respect to 360 degrees per cycle.

Figure 10:
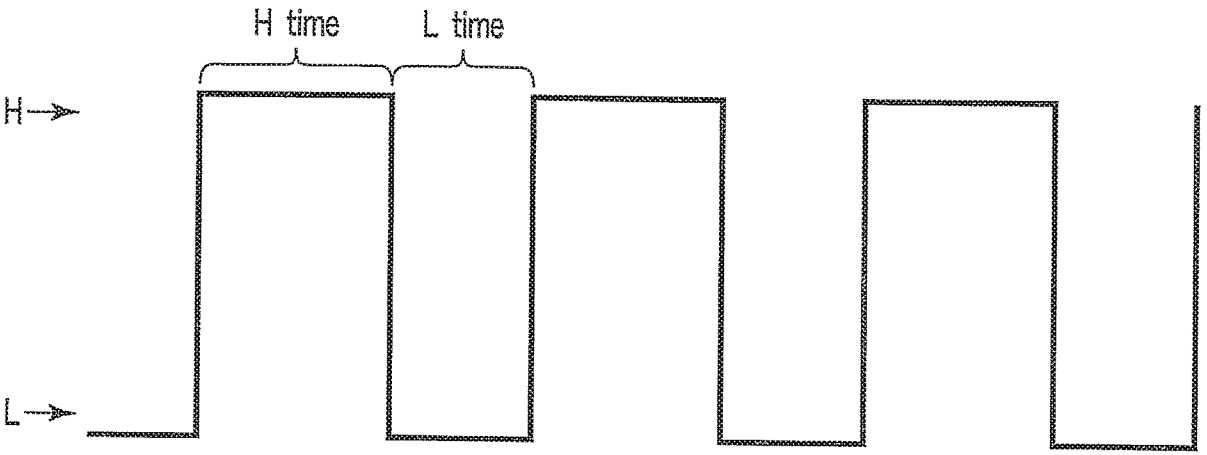
FIG. 10 is a view showing a detection waveform of an optical detecting apparatus according to the embodiment.

A change of the signals H and L output to the controlling unit from the optical detector 702 is in sync with rotation of the rotational body 501v and in a waveform shown in FIG. 10. Here, output time when the optical detector 702 outputs to the controlling unit the signal H is H time, and output time when the optical detector 702 outputs the signal L is L time.

In addition, since the slits each having 30 degrees are formed on the outer periphery surface of the rotational body 501v with equal intervals with respect to 360 degrees per cycle in an ideal condition, L time/H time=0.5 is obtained. Here, in consideration of a little detection error near boundaries between positions where the slits are formed and where the slits are not formed on the rotational body 501v, if L time/H time=0.2 to 0.8 is obtained, the controlling unit determines that the first toner cartridge 501 inserted in the copier main body 100 is a genuine product. If L time/H time is not within 0.2 to 0.8, the controlling device determines that the first toner cartridge 501 inserted in the copier main body 100 is not a genuine product.

Figure 11:
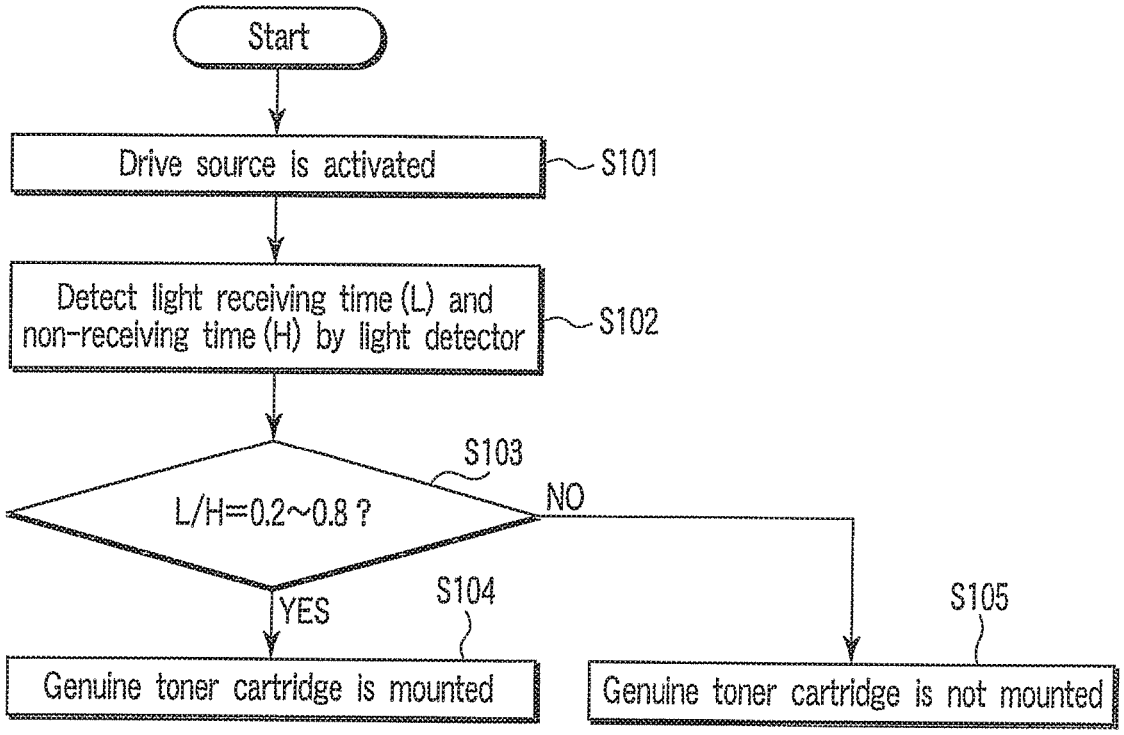
FIG. 11 is a flowchart showing a detecting method of the optical detecting apparatus according to the embodiment.

FIG. 11 is a flowchart showing the determination of the optical detector 702 whether the first toner cartridge 501 inserted in the copier main body 100 is a genuine product or not (S101).

When a driving device 700b is activated, the rotational body 501v rotates via the second drive gear 701c, the first drive gear 701b, the drive coupling member 701a, and the mixer gear 501l.

The optical detector 702 outputs to the controlling unit the signal H when the light receiving element 702b does not receive light from the light emitting element 702a, and the signal L when the light receiving element 702b receives light from the light emitting element 702a. Then, the controlling unit detects the output time when the optical detector 702 outputs the signal H to the controlling unit as the H time and the output time when the optical detector 702 outputs the signal L as the L time (S102).

At this time, when L time/H time=0.2 to 0.8 is obtained (S103, YES), the controlling unit determines that the first toner cartridge 501 inserted in the copier main body 100 is a genuine product (S104).

If L time/H time is not within 0.2 to 0.8 (S103, NO), then the controlling unit determines that the first toner cartridge 501 is not inserted in the copier main body 100, or the first toner cartridge 501 is not a genuine product (S105).

The controlling unit displays on the control panel 300 a result of the determination of whether the first toner cartridge 501 inserted in the copier main body 100 is a genuine product or not to notify the user thereof, and can also ask for attention.

As described above, in the present embodiment, a type of the first toner cartridge 501 can be discriminated accurately in a short period of time by a shape of the slit of the rotational body 501v. Although needless to say, the discrimination of a type of the first toner cartridge 501 can be changed to discrimination of a color, a destination, or others.

In the first toner cartridge 501 according to the present invention, a configuration of using the rotational body 501v and the optical detector 702 is not limited to the embodiment such as above. For example, the rotational body 501v may be a rotational body having a drum shape, and a reflecting part as a light incident part and a non-reflecting part may be formed with equal intervals on an outer periphery surface thereof. Then, the configuration may be such that, from the outside of the rotational body, light is irradiated from the light emitting element to the outer periphery surface of the rotational body, and the light reflected by the reflecting part is received by the light receiving element.

In addition, the rotational body 501v may also be provided to move in association with the mixer gear 501l, in addition to being arranged coaxially with the mixer gear 501l.

Next, a gear cover 501y which is an important part of the present embodiment will be described by using FIGS. 6 to 9. As shown in FIG. 9, by providing the optical detector 702 described above, a lead wire 704 for supplying power to the optical detector 702 and transmitting a signal to the control unit from the optical detector 702 exists, in addition to a lead wire 703 for supplying power to the driving source 700. A lead wire holder 705 bundles the lead wire 703 and the lead wire 704.

FIG. 8 is a rear surface view of the toner cartridge main body 501a. As shown in FIG. 8, outer periphery surfaces of the coupling member 501j and the mixer gear 501l have a cut gear, and mesh with each other. An outer periphery surface of the rotational body 501v has slits at a plurality of positions.

The lead wire 703 and the lead wire 704 are positioned near the coupling member 501j, the mixer gear 501l, and the rotational body 501v in a floatable manner. For this reason, in order to prevent the coupling member 501j, the mixer gear 501l, and the rotational body 501v from entangling the lead wire 703 and the lead wire 704, the gear cover 501y shown in FIGS. 6 and 8 is provided.

The gear cover 501y is formed so as to surround an outer periphery of the coupling member 501j and the mixer gear 501l on a front surface side of the first toner cartridge 501.

A part of the gear cover 501y surrounding the outer periphery of the coupling member 501j with almost the same curvature as that of the coupling member 501j is formed as described below. When the center of the coupling member 501j is set as a reference point, an outer edge 511 of the gear cover 501y is formed on the same position as, or distant from an outer edge 512 of the coupling member 501j toward an extending direction from the first toner cartridge 501.

A part of the gear cover 501y surrounding the outer periphery of the mixer gear 501l with almost the same curvature as that of the mixer gear 501l is formed as described below. When the center of the mixer gear 501l is set as a reference point, the outer edge 511 of the gear cover 501y is formed on the same position as, or distant from an outer edge 513 of the mixer gear 501l toward an extending direction from the first toner cartridge 501.

On the premise of the gear cover 501y surrounding the outer peripheries of the coupling member 501j and the mixer gear 501l under the above conditions, the following is formed. When the center of the rotational body 501v having a cylindrical shape is set as a reference point, at least a part of the outer edge 511 of the gear cover 501y is formed on the same position as, or distant from an outer edge 514 of the rotational body 501v toward an extending direction from the first toner cartridge 501.

As a matter of course, when the center of the rotational body 501v having a cylindrical shape is set as a reference point, all part of the outer edge 511 of the gear cover 501y may be formed on the same position as, or distant from an outer edge 514 of the rotational body 501v toward an extending direction from the first toner cartridge 501.

By providing the gear cover 501y, the lead wire 703 and the lead wire 704 are never placed close to the coupling member 501j, the mixer gear 501l, and the rotational body 501v, and entanglement can be prevented. In addition, the user can prevent hurting himself or herself while operation of exchanging the first toner cartridge 501, etc. since the coupling member 501j, the mixer gear 501l, and the rotational body 501v are covered by the gear cover 501y.

Further, the lead wire 703 and the lead wire 704 are made abutting the outer edge 511 of the gear cover 501y, thereby the lead wire 703 and the lead wire 704 do not float, and entanglement can be further prevented.

Here, a cartridge exterior surface part 501w formed by coupling the lid body 501c and the container 501b of the first toner cartridge 501 is shown in FIGS. 6, 8, and 9. The cartridge exterior surface part 501w is an outer periphery surface of the lid body 501c and the container 501b coupled together on a side where the mixer gear 501l is connected on the first toner cartridge 501. When the lid body 501c and the container 501b are coupled, an outer edge of the lid body 501c and an outer edge of the container 501b facing each other have the same shape and the same size. For this reason, the cartridge exterior surface part 501w is a flat surface without irregularities.

When the center of the rotational body 501v having a cylindrical shape is set as a reference point, the cartridge exterior surface part 501w is formed on the same position as, or distant from an outer edge 514 of the rotational body 501v toward an extending direction from the first toner cartridge 501.

Then, when the center of the rotational body 501v having a cylindrical shape is set as a reference point, the cartridge exterior surface part 501w is formed to have the same positional relationship with a furthest position in the outer edge 511 of the gear cover 501y toward an extending direction from the first toner cartridge 501. Therefore, a plane including a part at a furthest position toward an extending direction from the first toner cartridge 501 and the cartridge exterior surface part 501w in the outer edge 511 of the gear cover 501y is in a perpendicular relationship with respect to the first toner cartridge 501.

For this reason, the first toner cartridge 501 can be raised easily by having the gear cover 501y at the bottom.

In addition, when the center of the rotational body 501v having a cylindrical shape is set as a reference point, a part in the outer edge 511 of the gear cover 501y at a furthest position toward an extending direction from the first toner cartridge 501 may be set further than a surface of the cartridge exterior surface part 501w. In this case, in order that the plane including the outer edge 511 of the gear cover 501y is in a perpendicular relationship with respect to the first toner cartridge 501, when the center of the rotational body 501v having a cylindrical shape is set as a reference point, all of the outer edge 511 of the gear cover 501y can be formed to have the same position toward an extending direction from the first toner cartridge 501. In this manner, the first toner cartridge 501 can be raised easily by having the gear cover 501y at the bottom.

Further, when the center of the rotational body 501v having a cylindrical shape is set as a reference point, the outer edge 511 of the gear cover 501y may be formed to have a plurality of parts which are at a furthest position toward an extending direction from the first toner cartridge 501. In this case, the number of the plurality of parts is determined such that the first toner cartridge 501 can be raised by having the gear cover 501y at the bottom.

As described above, the first toner cartridge 501 can easily be raised by having the gear cover 501y at the bottom. Therefore, the first toner cartridge 501 can easily be made at a standstill by having a surface having a filling opening 501m for filling the toner as the top surface.

Therefore, when the first toner cartridge 501 is replenished with the toner, the replenishment of the toner can be carried out without requiring a special effort or a apparatus for holding the first toner cartridge 501.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toner cartridge comprising:

a toner container which contains toner;

a toner supplying opening which supplies the toner contained in the toner container to an image forming apparatus;

an agitating member which agitates the toner contained in the toner container;

a conveying member which conveys the toner contained in the toner container toward the toner supplying opening;

a plurality of gears which are provided on an exterior portion of the toner container and rotate the conveying member and the agitating member, the plurality of gears including two gears which have different diameters, *wherein a large gear of the two gears is coaxially attached to the agitating member, a small gear of the two gears is coaxially attached to the conveying member, and the large gear and small gear are in direct contact with each other*;

[an optical penetration member] *a rotational body* which has a plurality of [optical penetration parts] *light incidence parts* and is coaxially provided on [a] *the* large gear of the two gears; and a gear cover which covers a part of the plurality of the gears[, the gear cover being extended in the same direction as an extending direction of the optical penetration member].

2. The toner cartridge according to claim 1, wherein the toner container has a predetermined length along one direction, while the plurality of [the] gears and the gear cover are provided on one end of the toner container in the one direction, and a filling opening used for filling the toner container with the toner is formed on the other end of the toner container.

[3. The toner cartridge according to claim 2, wherein an outer edge of the gear cover is formed at further position than the plurality of the gears and an outer edge of the optical penetration member from the toner container toward an extending direction when the center of any one gear of the plurality of the gears is set as a reference point.]

[4. The toner cartridge according to claim 3, wherein the gear cover has a shape such that the toner cartridge can be stood stationary in a state that the gear cover is positioned at the bottom.]

[5. The toner cartridge according to claim 4, wherein a plane including an outer edge of the toner cartridge and an outer edge of the gear cover formed at positions further than outer edges of the plurality of the gears and the optical penetration member from a part of the toner container toward an extending direction when the center of any one gear of the plurality of gears is set as a reference point is in a perpendicular relationship with respect to the toner cartridge.]

[6. The toner cartridge according to claim 4, wherein a plane including an outer edge of the gear cover is in a perpendicular relationship with respect to the toner cartridge.]

7. An image forming apparatus, which has a toner cartridge inserted therein *configured* to [supplying] *supply* toner to the image forming apparatus, said apparatus comprising:

a toner container which contains toner;

a toner supplying opening which supplies the toner contained in the toner container to the image forming apparatus;

an agitating member which agitates the toner contained in the toner container;

a conveying member which conveys the toner contained in the toner container [toward] *towards* the toner supplying opening;

a plurality of gears which are provided on an exterior portion of the toner container and rotate the conveying member and the agitating member, the plurality of gears including two gears which have different diameters, *wherein a large gear of the two gears is coaxially attached to the agitating member, a small gear of the two gears is coaxially attached to the conveying member, and the large gear and the small gear are in direct contact with each other*;

[an optical penetration member] *a rotational body* which has a plurality of [optical penetration parts] *light incidence parts* and is coaxially provided on [a] *the* large gear of the two gears;

a gear cover which covers a part of the plurality of the gears[, the gear cover being extended in the same direction as an extending direction of the optical penetration member]; and a detecting unit which detects rotation of the [optical penetration member] *rotational body*.

8. The image forming apparatus according to claim 7, wherein an outer edge of the gear cover *is configured to* prevent lead wires that are connected to the detecting unit from being entangled in the gears.

*9. The toner cartridge according to claim 1, wherein the rotational body is configured to enable discrimination of a type of the toner cartridge.*

*10. The image forming apparatus according to claim 7, wherein the rotational body is configured to enable discrimination of a type of the toner cartridge.*

* * * * *